United States Patent
Suciu et al.

(10) Patent No.: US 10,001,061 B2
(45) Date of Patent: Jun. 19, 2018

(54) COOLING SYSTEM FOR GAS TURBINE ENGINES

(71) Applicant: UNITED TECHNOLOGIES CORPORATION, Farmington, CT (US)

(72) Inventors: Gabriel L Suciu, Glastonbury, CT (US); Brian D Merry, Andover, CT (US); James D Hill, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 171 days.

(21) Appl. No.: 14/732,319

(22) Filed: Jun. 5, 2015

(65) Prior Publication Data

US 2015/0354456 A1   Dec. 10, 2015

Related U.S. Application Data

(60) Provisional application No. 62/008,619, filed on Jun. 6, 2014.

(51) Int. Cl.
    *F01D 5/08*    (2006.01)
    *F02C 7/18*    (2006.01)
(52) U.S. Cl.
    CPC .............. *F02C 7/18* (2013.01); *F01D 5/085* (2013.01)
(58) Field of Classification Search
    None
    See application file for complete search history.

(56) References Cited

U.S. PATENT DOCUMENTS

| 2,791,091 | A | | 5/1957 | Wheatley et al. | |
|---|---|---|---|---|---|
| 4,021,138 | A | * | 5/1977 | Scalzo | F01D 5/081 |
| | | | | | 416/193 A |
| 4,820,116 | A | * | 4/1989 | Hovan | F01D 1/32 |
| | | | | | 415/115 |
| 4,884,950 | A | * | 12/1989 | Brodell | F01D 5/081 |
| | | | | | 415/173.7 |
| 5,232,339 | A | | 8/1993 | Plemmons et al. | |
| 5,795,130 | A | | 8/1998 | Suenaga et al. | |
| 2002/0081199 | A1 | * | 6/2002 | Pepi | F01D 5/066 |
| | | | | | 416/96 R |
| 2005/0111964 | A1 | * | 5/2005 | Krammer | F01D 5/082 |
| | | | | | 415/115 |

(Continued)

FOREIGN PATENT DOCUMENTS

| DE | 19854907 A1 * | 5/2000 | ............. F01D 5/082 |
|---|---|---|---|
| EP | 0313826 A1 | 5/1989 | |

(Continued)

OTHER PUBLICATIONS

European Search Report for EP Applcation No. 15 00 1689.

*Primary Examiner* — Woody Lee, Jr.
*Assistant Examiner* — Theodore Ribadeneyra
(74) *Attorney, Agent, or Firm* — Cantor Colburn LLP

(57) ABSTRACT

A cooling system for gas turbine engines includes a turbine rotor compartment defining a cooling air plenum. A plurality of turbine discs are rotatably housed within the rotor compartment. A cooling air inlet is in fluid communication with the plenum. Each turbine disc includes a cooling outlet in fluid communication with the plenum for cooling the rotor compartment.

12 Claims, 2 Drawing Sheets

(56) References Cited

U.S. PATENT DOCUMENTS

| | | | |
|---|---|---|---|
| 2007/0059158 A1* | 3/2007 | Alvanos | F01D 5/081 415/115 |
| 2009/0304495 A1* | 12/2009 | Bart | F01D 5/082 415/116 |
| 2010/0154433 A1* | 6/2010 | Ottaviano | F02C 3/08 60/785 |
| 2011/0085905 A1 | 4/2011 | Willett et al. | |
| 2011/0088405 A1* | 4/2011 | Turco | F01D 5/081 60/782 |
| 2011/0129336 A1* | 6/2011 | Bonneau | F01D 5/066 415/180 |
| 2012/0148405 A1 | 6/2012 | Willett et al. | |

FOREIGN PATENT DOCUMENTS

| | | | | |
|---|---|---|---|---|
| EP | 1413711 A1 | 4/2004 | | |
| EP | 2458147 A2 | 5/2012 | | |
| EP | 2586968 A2 | 5/2013 | | |
| FR | 2960260 A1 * | 11/2011 | | F01D 5/082 |
| GB | 2137283 A | 10/1984 | | |
| WO | 20040133684 A1 | 12/2004 | | |

\* cited by examiner

COOLING SYSTEM FOR GAS TURBINE ENGINES

CROSS-REFERENCE TO RELATED APPLICATION

This application claims the benefit of priority under 35 U.S.C. § 119(e) to U.S. Provisional Application No. 62/008,619, filed Jun. 6, 2014, which is incorporated herein by reference in its entirety.

BACKGROUND OF THE INVENTION

1. Field of the Invention

The present disclosure relates to turbine engines, and more particularly to turbine engines having improved high pressure turbine cooling.

2. Description of Related Art

A gas turbine engine typically includes a multi-stage axial compressor, a combustor, and a turbine. Airflow entering the compressor is compressed and directed to the combustor where it is mixed with fuel and ignited, producing hot combustion gases used to drive the turbine. To control the heat transfer induced by the hot combustion gases entering the turbine, typically cooling air is channeled through turbine cooling circuits and is used to cool various turbine components.

Maintaining sufficient cooling air within the gas turbine engine is critical to proper engine performance and component longevity. The flow of cooling air across the turbine rotor and through the interior of the blades removes heat so as to prevent excessive reduction of the mechanical strength properties of the turbine blades and turbine rotor. Typical cooling methods include directing cooling air from a variety of sources having different pressures and temperatures.

Such conventional methods and systems have generally been considered satisfactory for their intended purpose. However, there is still a need in the art for improved turbine cooling systems. The present disclosure provides a solution for this need.

SUMMARY OF THE INVENTION

A cooling system for gas turbine engines includes a turbine rotor compartment defining a cooling air plenum. A plurality of turbine discs are rotatbly housed within the rotor compartment. A cooling air inlet is in fluid communication with the plenum. Each turbine disc includes a cooling outlet in fluid communication with the plenum for cooling the rotor compartment. The cooling air inlet can be in fluid communication with a cooling air conduit aligned to deliver fluid output from a high pressure compressor.

The rotor compartment can include a plurality of seals proximate a hub of each turbine disc to fluidly seal the plenum. The rotor compartment can have first and second turbine discs. Each turbine disc can be sealingly engaged to the rotor compartment. A segmented seal can be disposed between the first and second turbine discs to isolate the plenum from a gas path outboard of the rotor compartment.

Each turbine disc can include a plurality of turbine blades mounted thereabout, wherein the turbine blades provide a cooling air outlet of the plenum. Each turbine disc can also have at least one passage through the hub thereof to allow cooling air from the inlet to circulate through the plenum.

Further, each turbine blade can have an axial passage therethrough to place the cooling air inlet in fluid communication with a portion of the plenum between the turbine discs. The passage can be disposed proximate of the turbine blades of each respective turbine disc.

A method for providing cooling air to a rotor stage includes delivering fluid output from a high pressure compressor through a cooling air inlet into a cooling air plenum defined by a rotor compartment. The method can further include sealing the cooling air plenum with a plurality of seals disposed near a hub of each turbine disc. In addition, a segmented seal can be disposed between first and second turbine discs to isolate the cooling air plenum from a gas path outboard of the rotor compartment. The method can further include cooling the plenum by flowing the fluid output through at least one passage of a hub of each turbine disc. Each turbine disc may include a plurality of turbine blades, each turbine disc having at least one passage proximate the turbine blades to place the cooling air inlet in fluid communication with a portion of the plenum between the turbine discs.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
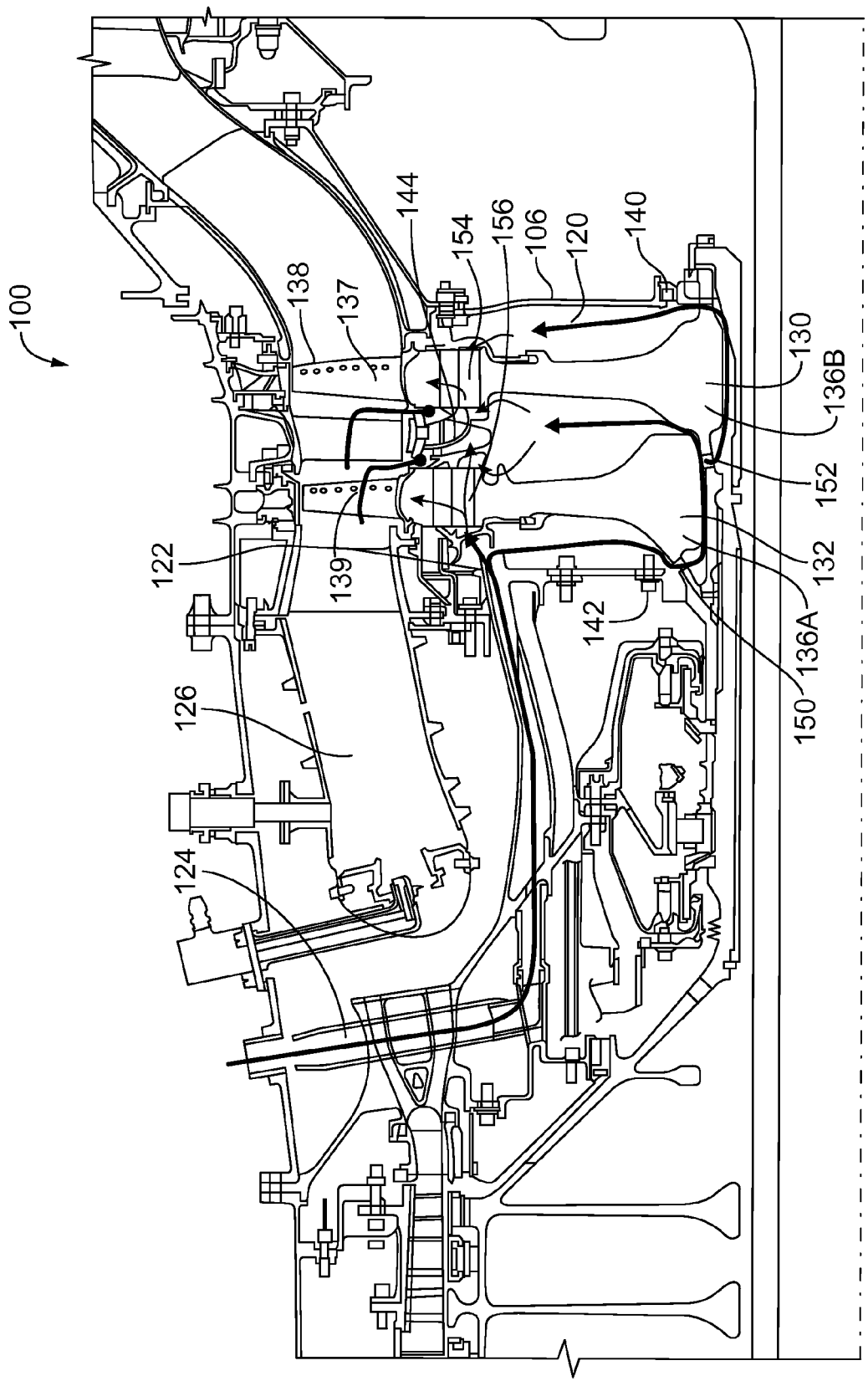
FIG. 1 is a side view of an exemplary embodiment of an incremental cooling system constructed in accordance with the present disclosure, showing a rotor compartment of a gas turbine engine being cooled from a single source of cooled air.

Reference will now be made to the drawings wherein like reference numerals identify similar structural features or aspects of the subject disclosure. For purposes of explanation and illustration, and not limitation, a partial view of an exemplary embodiment of a cooling system for gas turbine engines in accordance with the disclosure is shown in FIG. 1 and is designated generally by reference character 100. Other embodiments of the incremental cooling system in accordance with the disclosure, or aspects thereof, are provided in FIG. 2, as will be described.

A typical prior art method of cooling a gas turbine engine includes using cooling air to cool first and second rotors from a variety of sources. For example, one cooling line is typically provided from cooled air external to the system whereas another cooling line is typically for cooled compressor discharge air. Each of the different cooling lines being directed to cool different parts of the rotors. Typically, turbine discs in turbine engines of the prior art do not allow for cooled air to reach between or around each disc. Moreover, the sources of cooling air used in the typical configurations are at different levels of pressure and temperature.

This variation leads to compromises and increased stress on the turbine components due to the thermal gradient.

FIG. 1 illustrates an exemplary embodiment of a turbine engine 100 of the present disclosure where first and second turbine discs 130, 132, respectively, of a rotor compartment 106 are cooled entirely from the same source of cooling air 51. Uncombusted high pressure air, typically referred to as T3 air, for example, is passed through a tangential on-board injector ("TOBI") nozzle. The TOBI nozzle reduces the relative total temperature of the T3 air. The reduced temperature T3 air is directed to the rotor compartment 106 to cool the entire rotor system. In addition, the flow paths within the rotor compartment and a plurality of seals around the rotor compartment are arranged to provide cooling air to the entire rotor compartment, forward and aft of rotor discs, from the single source, without the need for additional sources of cooling air. This ensures that the entire rotor system is cooled from a single source with one temperature and pressure thereby improving the longevity of motor life compared to a traditional system.

Figure 2:
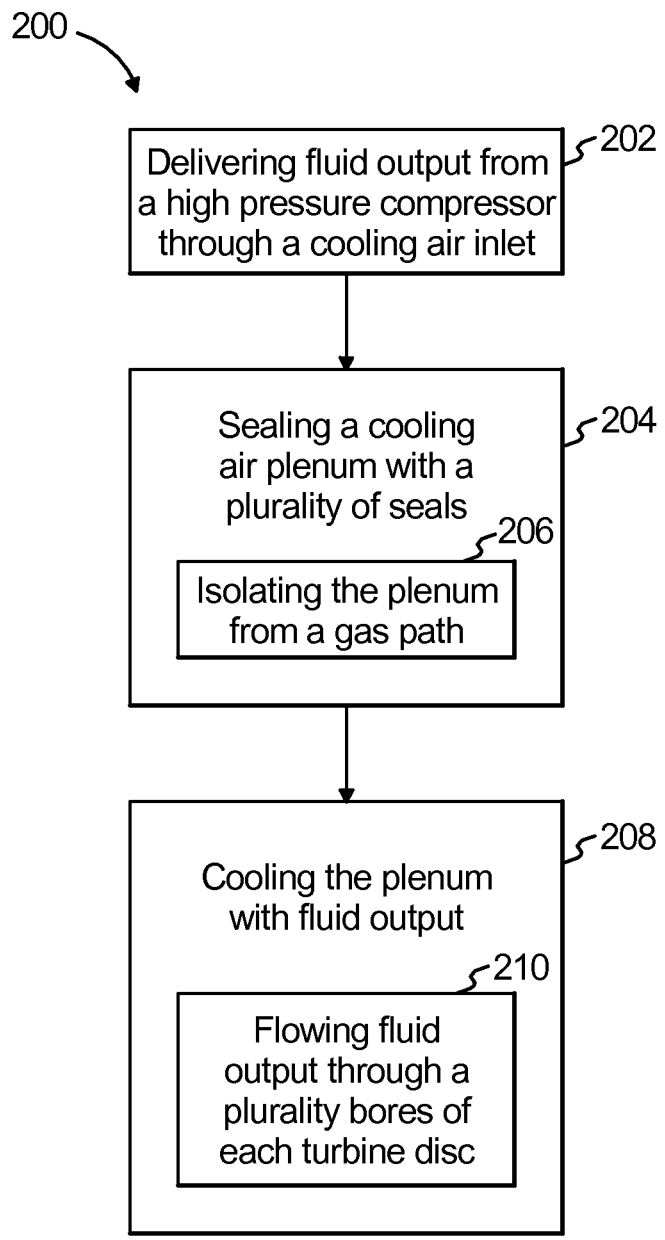
FIG. 2 is a flow chart showing the method steps for providing cooling air to a rotor stage.

With continued reference to FIG. 1, the rotor compartment 106 defines a sealed cooling air plenum 120 in fluid communication with a cooling air inlet 122. T3 cooling air is directed to the cooling air inlet via a cooling air conduit 124. A plurality of turbine discs 130, 132 are rotatably housed within the rotor compartment 106. First and second turbine discs 130, 132 are shown in FIG. 2, however it will be understood by those skilled in the art, the rotor compartment may contain any suitable number of turbine discs.

The sealed cooling air plenum 120 is fluidly sealed by a plurality of seals 140, 142, 144 disposed around the turbine discs 130, 132, forward and aft of the discs as shown in FIG. 1, to cool the entire rotor compartment 106. For example, seals 140 (aft-of-disc seal) and 142 (forward-of-disc seal) are located near hubs 136, 136A of the turbine discs 130, 132. In addition, a segmented seal 144 is disposed between the first and second turbine discs 130, 132. The segmented seal 144 isolates the sealed cooling air plenum 120 from a gas path 126 outboard of the rotor compartment 106. This allows the cooling air to flow inboard of the segmented seal 144 around the first and second turbine discs 130, 132.

To direct the flow of cool air within the entire rotor compartment 106, each turbine disc 130, 132 of the present disclosure includes passages in fluid communication with the plenum for cooling the rotor compartment. More specifically, a plurality of passages 150, 152, 154, 156 are disposed within turbine discs 130, 132 to allow the cooling air to flow therethrough and reach the entire plenum. At least one passage 150, 152 is provided through hubs 136, 136A of each of the first and second turbine discs 130, 132. This allows cooling air to flow through the hub and between the first and second turbine discs 130, 132 as indicated by the flow arrows in FIG. 1. At least one axial passage 154, 156 is also provided within each turbine disc 130, 132. This allows cooling air to flow between each turbine disc 130, 132 and around the segmented seal 144. Each turbine disc includes a plurality of turbine blades 137, 139 mounted thereabout. The turbine blades 137, 139 provide cooling air outlets 138 to the sealed plenum 120.

It will be understood by those skilled in the art that the seals and passages are positioned to fluidly seal the rotor compartment while allowing the cooling air to circulate within the entire plenum to cool components of the turbine engine. Additional seals and/or passages may be included. Further, the positioning of the seals and/or passages may be adjusted, changed or modified without departing from the spirit and scope of the present disclosure.

A method for providing cooling air to a rotor stage is also disclosed. The method 200 comprises, at box 202, delivering fluid output from a high pressure compressor through a cooling air inlet, e.g., air inlet 122, into a cooling air plenum, e.g., sealed plenum 120, defined by a rotor compartment, e.g., rotor compartment 106. The method further includes sealing the plenum with a plurality of seals, e.g., seals 140, 142, 144, at box 204. At least one seal disposed near a hub of each turbine disc and a segmented seal between first and second turbine discs. The segmented seal isolating the plenum from a gas path outboard the rotor compartment, as shown in box 206. At described in boxed 208 and 210, to allow fluid to flow through each turbine disc and cool the plenum with fluid output, at least one passage, e.g., passages 150, 152, 154, 156, is positioned through the hub of each turbine disc. Further, placing the cooling air inlet in fluid communication with a portion of the plenum between the turbine discs is constructed by providing at least one passage proximate turbine blades, e.g., blades 137, 139.

While shown and described in the exemplary context of using T3 air as cooling fluid, those skilled in the art will readily appreciate that any other suitable cooling fluid from any other suitable source can be used without departing from the scope of this disclosure. Moreover, while shown and described in the exemplary context of cooling turbine components, any other suitable components, e.g., compressor or combustor components, can also be cooled with the methods and delivery described herein.

The methods and systems of the present disclosure, as described above and shown in the drawings, provide for an incremental cooling system for turbine engines with superior properties including cooling a turbine engine with cooled air from a single source. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A cooling system for gas turbine engines, comprising:
   a turbine rotor compartment defining a sealed cooling air plenum;
   a plurality of seals arranged about the turbine rotor compartment to fluidly seal the sealed cooling air plenum;
   a plurality of turbine discs rotatably housed within the rotor compartment and within the sealed cooling air plenum such that the plurality of turbine discs are cooled entirely, forward and aft, from a single source of cooling air within the sealed cooling air plenum, such that the cooling air within the sealed cooling air plenum flows along the entire radial length of the forward and aft sides of each turbine disc; and
   a cooling air inlet in fluid communication with the plenum to supply air from the single cooling source through a tangential on-board injector nozzle fluidly connected to the single source,
   wherein each turbine disc has a hub having at least one passage therethrough constructed to avow the fluid output to cool the plenum.

2. The cooling system of claim 1, wherein the cooling air inlet is in fluid communication with a cooling air conduit aligned to deliver fluid output from a high pressure compressor.

3. The cooling system of claim 1, wherein the rotor compartment includes a plurality of seals near each hub to fluidly seal the plenum.

4. The cooling system of claim 1, wherein the rotor compartment has first and second turbine discs with a segmented seal disposed therebetween to isolate the plenum from a gas path outboard of the rotor compartment.

5. The cooling system of claim 1, wherein each turbine disc includes a plurality of turbine blades, each turbine blade having at least one cooling outlet in fluid communication with the plenum.

6. The cooling system of claim 5, wherein at least one of the turbine discs has an axial passage therethrough to place the cooling air inlet in fluid communication with a portion of the plenum between the turbine discs.

7. The cooling system of claim 6, wherein the axial passage of each turbine disc is disposed proximate of turbine blades thereof.

8. A method of providing cooling air to a rotor stage, comprising:
 delivering fluid output from a high pressure compressor as a single source through a cooling air inlet, through a tangential onboard injector, and into a cooling air plenum defined by a rotor compartment having a set of turbine discs rotatably housed therein, cooling the plenum by flowing the fluid output through at least one passage of a hub of each turbine disc,
 wherein the cooling air plenum is sealed by a plurality of seals arranged about the turbine rotor compartment to fluidly seal the sealed cooling air plenum, and wherein the set of turbine discs are within the sealed cooing air plenum such that the turbine discs are cooled entirely, forward and aft, from the single source of cooling air within the sealed cooling air plenum, such that the cooling air within the sealed cooling air plenum flows along the entire radial length of the forward and aft sides of each turbine disc.

9. The method of claim 8, further including sealing the cooling air plenum with a plurality of seals disposed near a hub of each turbine disc.

10. The method of claim 8, further including isolating the cooling air plenum from a gas path outboard of the rotor compartment by disposing a segmented seal between first and second turbine discs.

11. The method of claim 8, wherein each turbine disc includes a plurality of turbine blades, each turbine blade having at least one cooling outlet in fluid communication with the cooling plenum.

12. The method of claim 11, further including placing the cooling air inlet in fluid communication with a portion of the plenum between the turbine discs by flowing the fluid output through at least one axial passage proximate the turbine blades.

* * * * *